_United States Patent Office_

3,542,786
Patented Nov. 24, 1970

3,542,786
ORGANOSILICON COMPOUNDS
William E. Weesner, Kettering, and John L. Schaar, Dayton, Ohio, assignors to Monsanto Research Corporation, St. Louis, Mo., a corporation of Delaware
No Drawing. Filed Feb. 23, 1968, Ser. No. 707,453
Int. Cl. C07d 37/16, 33/36
U.S. Cl. 260—279
4 Claims

ABSTRACT OF THE DISCLOSURE

The organosilicon compounds represented by the formula

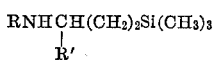

wherein R is selected from the group consisting of

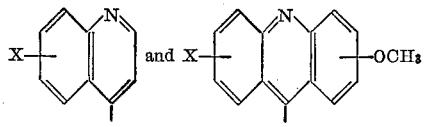

wherein X is chlorine or fluorine; and R' is hydrogen or lower alkyl.

---

The invention herein described was made in the course of or under a contract with the Department of the Army.

BACKGROUND OF THE INVENTION

This invention pertains to silicon-containing carbon compounds and more particularly to certain trimethylsilylmethyl derivatives of substituted heterocyclic compounds containing one hetero-N atom. The invention is further directed to the production of biological toxicant compounds.

SUMMARY OF THE INVENTION

An object of this invention is to provide novel organosilicon compounds having utility as biological toxicants. Another object is the provision of new selective herbicides and nematocides.

These and other objects hereinafter defined are met by the invention wherein there is provided an organosilicon compound of the formula

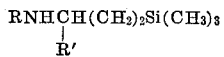

wherein R is selected from the group consisting of

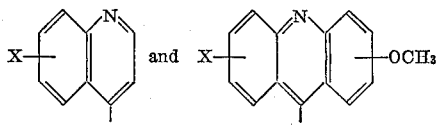

wherein X is chlorine or fluorine; and R' is selected from the group consisting of hydrogen and lower alkyl of from 1 to 6 carbon atoms.

The organosilicon compounds of the present invention may be prepared by several methods. As a preferred method, a substituted heterocyclic nitrogen compound containing at least one nuclearly substituted chlorine atom is reacted at 100–140° C. with a trimethylsilyl-substituted alkyl primary amine in the presence of phenol and anhydrous sodium or potassium carbonate. The product is thereafter recovered by treating the reaction mixture with an aqueous solution of sodium hydroxide, and recrystallizing the solids thus obtained. The products are generally crystalline solids that are soluble in ethanol, benzene or hexane and are useful as biological toxicants as will be hereinafter disclosed.

Specific examples of the substituted heterocyclic nitrogen compounds useful in preparing the products of this invention are:

4,5-dichloroquinoline,
4,7-dichloroquinoline,
4-chloro-7-fluoroquinoline,
4-chloro-8-fluoroquinoline,
5,9-dichloro-3-methoxyacridine,
6,9-dichloro-2-methoxyacridine,
9-chloro-6-fluoro-2-methoxyacridine,
9-chloro-5-fluoro-4-methoxyacridine, etc.

Specific examples of the trimethylsilyl-substituted alkyl primary amines are:

3-trimethylsilylpropylamine,
2-amino-4-trimethylsilylbutane,
3-amino-5-trimethylsilylpentane,
3-ethyl-4-amino-6-trimethylsilylhexane, etc.

Specific examples of the organosilicon products of this invention represented by the formula

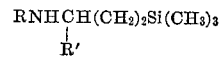

are:

5-chloro-4-(3-trimethylsilylpropylamino)quinoline,
7-fluoro-4-(3-trimethylsilylpropylamino)quinoline,
7-fluoro-4-(1-methyl-3-trimethylsilylpropylamino)quinoline,
8-fluoro-4-[1-(3-pentyl)-3-trimethylsilylpropylamino]quinoline,
6-chloro-2-methoxy-9-(3-trimethylsilylpropylamino)acridine,
6-fluoro-2-methoxy-9-(1-methyl-3-trimethylsilylpropylamino)acridine,
5-fluoro-4-methoxy-9-(1-ethyl-3-trimethylsilylpropylamino)acridine, etc.

The organosilicon products of this invention are useful as biological toxicants. The quinoline derivatives are particularly useful as herbicides, especially for post-emergence spray for control of undesired vegetation. For this purpose the active ingredient may be dissolved in a solvent, or dispersed in an emulsion or even a dusting formulation so that the active ingredient may be applied to the soil or plant surfaces in a toxic concentration in a form which enables prompt assimilation by the germinating seeds, emerging seedlings, or full grown plants. There may also be added various surface active agents as wetting or emulsifying agents, e.g., water-soluble salts of long-chain carboxylic acids, sulfonated animal, vegetable or mineral oils, etc. The acridine derivatives are useful as nematocides, such as for the control of _Turbatrix aceti_, and may be applied to the organism in a toxic concentration either as a solution or emulsion, or in a dusting formulation. Wetting or emulsifying agents may be present.

DESCRIPTION OF THE PREFERRED EMBODIMENTS

The invention is further illustrated by, but not limited to, the following examples.

EXAMPLE 1

This example illustrates the preparation of 7-fluoro-4-(3-trimethylsilylpropylamino)quinoline:

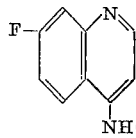

A mixture of 9.1 g. (0.05 mole) of 4-chloro-7-fluoroquinoline, 6.6 g. (0.05 mole) of 3-trimethylsilylpropylamine (see Sommer and Rockett, Journal of the American Chemical Society, vol. 73, p. 5130 (1951)), 3.74 g. (0.03 mole) of anhydrous potassium carbonate and 30 g. of phenol was heated at 138–142° C. for 20 hours.

The molten reaction mixture was poured into 200 ml. of 20% NaOH and 16.8 g. of semi-crystalline solid was recovered. This solid was dissolved in 150 ml. of hot ethanol, decolorized with charcoal and the solvent removed. The residue was triturated with 125 ml. of hexane and 7.1 g. of solid was obtained. This solid was dissolved in 40 ml. of benzene, decolorized, and precipitated with 90 ml. of hexane. The white 7-fluoro-4-(3-trimethylsilylpropylamino)quinoline obtained weighed 3.5 g., M.P. 143–144.5° C.

Calc'd for $C_{15}H_{21}FN_2Si$ (percent): C, 65.17; H, 7.66; F, 6.87; N, 10.14; Si, 10.16. Found (percent): C, 65.20; H, 7.44; F, 6.80; N, 10.18; Si, 10.15.

EXAMPLE 2

This example illustrates the preparation of 7-fluoro-4-(1-methyl-3-trimethylsilylpropylamino)quinoline:

There was first prepared 2-amino-4-trimethylsilylbutane as an intermediate. A mixture of 18.2 g. (0.13 mole) of 4-trimethylsilyl-2-butanone, prepared by the method of Sommer and Marans (Journal of the American Chemical Society, vol. 72, p. 1935 (1950)), 65 ml. of methanol containing 17.0 g. (1.0 mole) of ammonia and 2 g. of Raney nickel catalyst was heated in a stainless steel rocking autoclave under 2500 p.s.i. of hydrogen at 150° C. for 2.5 hours. After cooling, the catalyst was removed by filtration, and the filtrate was evaporated to dryness. The liquid residue was dissolved in ether, the solution was saturated with anhydrous HCl, and the white solid hydrochloride filtered off. The crude weight was 6.1 g. (30% yield), M.P. 187–188° C. This solid was recrystallized from a solution of 5 ml. of ethanol and 100 ml. of acetone to give about 5.0 g. of 2-amino-4-trimethylsilylbutane hydrochloride, M.P. 186.5–188° C.

Calc'd for $C_7H_{19}NSi \cdot HCl$ (percent): C, 46.25; H, 11.09; Cl, 19.50; N, 7.71; Si, 15.45. Found (percent): C, 46.24; H, 11.05; Cl, 19.62; N, 7.67; Si, 15.54.

A mixture of 3.8 g. (0.02 mole) of 4-chloro-7-fluoroquinoline, 1.5 g. (0.01 mole) of dried $K_2CO_3$, and 10 g. of phenol was warmed to 50° C. A dry ether solution containing 3.1 g. (0.02 mole) of 2-amino-4-trimethylsilylbutane was added to the warm mixture, and the ether was distilled off. The ether solution was prepared by treating 3.8 g. (0.02 mole) of 2-amino-4-trimethylsilylbutane hydrochloride (obtained above) with 10 ml. of 20% NaOH, 30 ml. of water and 50 ml. of ether. After shaking, the ether layer was removed and the water layer again extracted with 50 ml. of ether. The extracts were dried to remove water. After ether removal, the reaction mixture was heated at 130° C. for 18 hours. The resulting warm melt was poured into 250 ml. of 4% NaOH and stirred for 4 hours. The dark, semicrystalline solid which formed was filtered off and air-dried to give 6.0 g. of crude product. This solid was decolorized in 125 ml. of refluxing ethanol. The 4.7 g. of oil obtained on solvent removal was crystallized from 20 ml. of hexane at −20° C. There was obtained 2.0 g. (32.8% yield) of 7-fluoro-4-(1-methyl-3-trimethylsilylpropylamino)quinoline, M.P. 139–141° C.

Calc'd for $C_{16}H_{23}FN_2Si$ (percent): C, 66.16; H, 7.98; F, 6.54; N, 9.65; Si, 9.67. Found (percent): C, 66.47; H, 8.03; F, 6.68; N, 9.48; Si, 9.60.

EXAMPLE 3

This example illustrates the preparation of 6-chloro-2-methoxy-9-(3-trimethylsilylpropylamino)acridine:

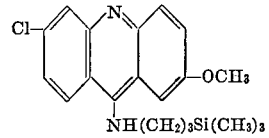

A mixture of 6.9 g. (0.03 mole) of 6,9-dichloro-2-methoxyacridine (M.P. 160–161.5° C.), 30.0 g. (0.39 mole) of phenol, 1.8 g. (0.03 mole) of anhydrous potassium carbonate and 3.3 g. (0.03 mole) of 3-trimethylsilylpropylamine was heated at 104–106° C. for 4 hours. The hot product was then poured into 200 ml. of 20% aqueous NaOH. Filtration and drying gave 8.4 g. of crude product (M.P. 138–140° C.) which was recrystallized twice from ethanol to give 3.8 g. (41% yield) of vivid yellow 6-chloro-2-methoxy-9-(3-trimethylsilylpropylamino)acridine, M.P. 140–141.5° C.

Calc'd for $C_{20}H_{25}ClN_2OSi$ (percent): C, 64.41; H, 6.76; Cl, 9.51; N, 7.51; Si, 7.53. Found (percent): C, 64.21; H, 6.93; Cl, 9.41; N, 7.49; Si, 7.43.

EXAMPLE 4

This example illustrates the application of the products of Examples 1 and 2 as herbicides.

A solution of 7-fluoro-4-(3-trimethylsilylpropylamino)quinoline in acetone-water, together with a sulfonate-type emulsifying agent, was sprayed on soil containing weed and crop seeds in a concentration corresponding to 10 lbs./acre. The sprayed soil was observed two weeks later, after maintenance of conditions conducive to germination and growth of the seeds. Sorghum, tomato, and soybean, were entirely unharmed, whereas the herbicide pre-emergent treatment produced substantial to complete suppression of the emergence and growth of wild buckwheat, pigweed, and foxtail.

A solution of 7-fluoro-4-(1-methyl-3-trimethylsilylpropylamino)quinoline in 0.5% concentration by weight in acetone-water, together with a sulfonate-type emulsifying agent, was applied to 2-week old plants. The injuries to the plants were observed 2 weeks later. Soybean, sugar beets, rye grass and brome grass were entirely unharmed, whereas growth of pigweed was considerably suppressed.

EXAMPLE 5

This example illustrates the application of the product of Example 3 as a nematocide.

A solution of 6-chloro-2-methoxy-9-(3-trimethylsilylpropylamino)acridine in 0.5% concentration by weight in acetone-water, together with a polyoxyethylene-type emulsifying agent was added to an aqueous suspension of *Turbatrix aceti* (vinegar eelworm) so that the concentration of active agent was 10 p.p.m. The mobility of the nematodes was observed, and after 30 minutes was substantially zero, compared to the control of 100.

It is to be understood that although the invention has been described with specific reference to particular embodiments thereof, it is not to be so limited since changes and alterations therein may be made which are within the full intended scope of this invention as defined by the appended claims.

What we claim is:

1. An organosilicon compound of the formula

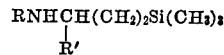

wherein R is selected from the group consisting of

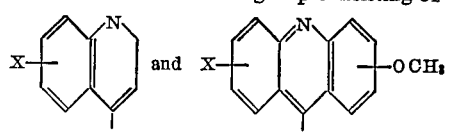

wherein X is chlorine or fluorine; and R' is selected from the group consisting of hydrogen and lower alkyl of from 1 to 6 carbon atoms.

2. The compound of claim 1 wherein R is

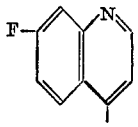

and R' is hydrogen.

3. The compound of claim 1 wherein R is

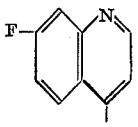

and R' is methyl.

4. The compound of claim 1 wherein R is

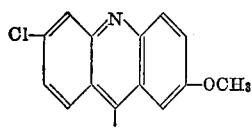

and R' is hydrogen.

References Cited

UNITED STATES PATENTS

| | | | |
|---|---|---|---|
| 2,612,511 | 9/1952 | Orkin | 260—289 X |
| 2,928,858 | 3/1960 | Morehouse | 260—289 X |
| 3,008,923 | 11/1961 | Lisawke | 260—279 |
| 3,466,270 | 9/1969 | Cook | 260—279 |
| 3,489,781 | 1/1970 | Wilkus | 260—315 |

DONALD G. DAVIS, Primary Examiner

U.S. Cl. X.R.

71—94; 260—283, 288, 448.2; 424—257, 258